US007074267B2

(12) United States Patent
Coughlin et al.

(10) Patent No.: US 7,074,267 B2
(45) Date of Patent: Jul. 11, 2006

(54) COMPOSITIONS AND METHODS FOR IMPARTING IMPROVED RHEOLOGY ON PIGMENT BASED INKS AND PAINTS

(75) Inventors: Stephen John Coughlin, Muirhead (GB); Iain Frank Fraser, Kilbirnie (GB); Thomas Healy, Paisley (GB); Stuart Cook Niven, Irvine (GB)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/512,013

(22) PCT Filed: Apr. 24, 2003

(86) PCT No.: PCT/EP03/04259

§ 371 (c)(1),
(2), (4) Date: Oct. 19, 2004

(87) PCT Pub. No.: WO03/093373

PCT Pub. Date: Nov. 13, 2003

(65) Prior Publication Data

US 2005/0115464 A1 Jun. 2, 2005

(30) Foreign Application Priority Data

Apr. 29, 2002 (EP) ................... 02405349

(51) Int. Cl.
C09B 69/02 (2006.01)
C09B 67/22 (2006.01)
C09B 67/08 (2006.01)
C09D 11/02 (2006.01)

(52) U.S. Cl. .................. 106/493; 106/31.28; 106/31.6; 106/494; 106/495; 106/496; 106/497; 106/498; 106/499

(58) Field of Classification Search ................ 106/493, 106/494, 495, 496, 497, 498, 499, 31.28, 106/31.6
See application file for complete search history.

(56) References Cited

U.S. PATENT DOCUMENTS

| 3,759,731 | A | | 9/1973 | Kühne et al. | ................ 106/288 |
| 3,759,733 | A | | 9/1973 | Bradley et al. | ............. 106/309 |
| 4,162,348 | A | * | 7/1979 | Juzu et al. | .................. 428/416 |
| 5,264,032 | A | * | 11/1993 | Dietz et al. | ................. 106/411 |
| 5,344,465 | A | * | 9/1994 | Colberg et al. | ................ 8/639 |
| 6,080,209 | A | | 6/2000 | Wiesenfeldt et al. | .......... 8/437 |
| 6,123,758 | A | * | 9/2000 | Colt | ........................ 106/31.43 |
| 6,503,317 | B1 | * | 1/2003 | Ortalano et al. | ............ 106/493 |
| 6,672,717 | B1 | * | 1/2004 | Smith | ........................ 347/100 |

FOREIGN PATENT DOCUMENTS

| DE | 2012152 | 9/1971 |
| DE | 2135468 | 2/1972 |
| DE | 19547800 | 6/1996 |
| EP | 0076024 | 4/1983 |
| EP | 0517513 | 12/1992 |
| EP | 0648816 | 4/1995 |
| GB | 1356253 | 6/1974 |
| JP | 56005552 | 1/1981 |
| WO | 97/35927 | 10/1997 |
| WO | 99/61534 | 12/1999 |
| WO | 01/10963 | 2/2001 |

OTHER PUBLICATIONS

Derwent Abstr. 1979-48186B [26] for JP 54063132, May 1979.
Derwent Abstr. 1996-301788 [31] for DE 19547800, Jun. 1996.
Derwent Abstr. 95-148698/20 for EP 0648816, Apr. 1995.

* cited by examiner

Primary Examiner—Anthony J. Green
(74) Attorney, Agent, or Firm—Joseph C. Suhadolnik

(57) ABSTRACT

Pigment composition comprising an organic pigment and a combination of at least two normally water-soluble coloured compounds (dyes) of opposing charge, i.e. of at least one anionic and one cationic dye are provided. The compositions impart improved rheology on non-aqueous pigment based printing inks and paints.

41 Claims, No Drawings

COMPOSITIONS AND METHODS FOR IMPARTING IMPROVED RHEOLOGY ON PIGMENT BASED INKS AND PAINTS

The present invention is directed to pigment compositions containing besides an organic pigment at least two coloured compunds of opposing charge, and ink/paint compositions containing same.

The ink/paint compositions show improved Theological (flow) performance and no loss or almost no loss in colour strength.

In order to improve the flow properties of pigment compositions, it is known from GBA-1,356,253 to incorporate in diarylide pigments (1) water-soluble azo dyestuffs which have the same general chemical structure as the pigment but contain acidic groups and (2) fatty alcohols, fatty acids, fatty esters or fatty amines.

One of the pair of agents (1) and (2) is not coloured and therefore does not contribute colour intensity to the pigment composition. In addition the non-coloured portion can interfere with the performance of other pigment additives, and lithographic properties of resulting inks can be affected leading to printing problems.

U.S. Pat. No. 4,461,647 describes so-called fluidized agents which are water-insoluble asymmetric dyestuffs substituted by long chain ammonium salts which are added to pigment dispersions in order to enhance their fluidity and flocculation resistance.

Fluidizing agents are restricted to pigment derivatives and can suffer from colour strength loss, lithographic problems and interference with other pigment additives.

There is a need in pigment industry, therefore, to pigment compositions to be used in inks and paints with improved Theological properties (stability to flocculation) and good coloristic effects.

It has now been found surprisingly that pigment compositions comprising an organic pigment and a combination (complex) of at least two, normally water-soluble, coloured compounds (dyes) of opposing charge, e.g. of at least one anionic and one cationic dye, which dyes are readily available ones, as dispersants for the pigment, can largely overcome the mentioned problems of conventional pigment compositions.

It is assumed that the dyes of opposing charge are complexed in such a way as to be retained within the pigment composition. Alternatively, the retention of both the dyes by separate desolubilisation mechanisms is also possible.

Accordingly, the present invention provides in a first aspect, a pigment composition comprising (1) an organic pigment and (2) a combination of at least one anionic and at least one cationic coloured compound wherein the combination (2) comprises (a) at least one anionic and at least one cationic dye, each of a chemical structure differing from that of the organic pigment (1),
(b) at least one anionic and at least one cationic pigment derivative, the chemical structure of at least one of which is not derived from said organic pigment (1), or
(c) mixtures of (a) and (b).

In a second aspect, the present invention provides said pigment composition as a solid composition, preferably as a pigment powder or as pigment granules.

In a further aspect, the present invention provides a non-aqueous composition, preferably a non-aqueous pigment dispersion.

In another aspect, the present invention provides methods for preparing said solid or non-aqueous pigment compositions.

In yet another aspect, the present invention provides non-aqueous inks or paints (oil ink or paint compositions, based e.g. on petroleum distillates) containing said pigment dispersions, and methods for preparing them.

In yet another aspect, the present invention provides the use of said non-aqueous inks or paints (ink or paint compositions) in printing and paint systems.

These and further aspects of the present invention will be described in the following.

The basis for the inventive pigment composition can be from the range of organic pigments such as, but not exclusively, monoazo, disazo, naphthol, dioxazone, azomethin, azocondensation, metal complex, nitro, perinone, quinoline, anthraquinone, benzimidozolone, isoindoline, isoindolinone, qulnacridone, hydroxyanthraquinone, aminoanthraquinone, anthrapyrimidine, indanthrone, flavanthrone, pyranthrone, anthantrone, isoviolanthrone, diketopyrrolopyrrole, carbazole, perylene, indigo or thioindigo pigments.

The range of interesting organic pigments may comprise monoazo, disazo, naphthol, dioxazone, azomethin, azocondensation, metal complex, nitro, perinone, quinoline, anthraquinone, benzimidozolone, isoindoline, isoindolinone, quinacridone, hydroxyanthraquinone, aminoanthraquinone, anthrapyrimidine, indanthrone, flavanthrone, pyranthrone, anthantrone, isoviolanthrone, diketopyrrolopyrrole, carbazole, indigo or thiolndigo pigments. Mixtures of the pigments may be used.

Examples of these pigments and also further pigments can be found in the monograph: W. Herbst, K. Hunger "Industrielle Organische Pigmente," $2^{nd}$ edition, 1995, VCH Verlagsgesellschaft.

Preferred pigments for the application of the present invention are mono- or disazo pigments, preferably mono- or diarylides, or metal complexes, preferably a copper phthalocyanine pigment, or naphthol pigments, preferably β-naphthol or a β-oxynaphthoic acid (BONA) pigments, or quinacridones or indanthrones.

More preferably, the following organic pigments are used inventively:

Mono- or diarylide yellow pigments selected from C.I. Pigment Yellow 1, 2, 10, 12, 13, 14, 17, 61, 62, 63, 64, 65, 73, 74, 75, 83, 127, 168, 174, 176, 188 and 191.

Monoarylide yellow pigments selected from C.I. Pigment Yellow 1, C.I. Pigment Yellow 2, C.I. Pigment Yellow 65, C.I. Pigment Yellow 73, C.I. Pigment Yellow 74 and C.I. Yellow 75.

Diarylide yellow pigments selected from C.I. Pigment Yellow 12, C.I. Pigment Yellow 13, C.I. Pigment Yellow 14, C.I. Pigment Yellow 17 and C.I. Pigment Yellow 83.

Disazo orange pigments selected from C.I. Pigment Orange 16 and C.I. Pigment Orange 34.

Naphthol red pigments selected from C.I. Pigment Red 48:1, C.I. Pigment Red 48:2, C.I. Pigment Red 48:3, C.I. Pigment Red 48:4, C.I. Pigment Red 48:5, C.I. Pigment Red 49:1, C.I. Pigment Red 52:1, C.I. Pigment Red 52:2, C.I. Pigment Red 52:3, C.I Pigment Red 53:1, C.I. Pigment Red 53:2, C.I. Pigment Red 53:3, C.I. Pigment Red 57:1, C.I. Pigment Red 57:2, C.I. Pigment Red 58:2, C.I. Pigment Red 58:4, C.I. Pigment Red 63:1 and C.I. Pigment Red 64:1.

Quinacridone red pigments such as C.I. Pigment Red 202.

Blue or green copper phthalocyanine pigments selected from C.I. Pigment Blue 15:1, C.I. Pigment Blue 15:2, C.I. Pigment Blue 15:3, C.I. Pigment Blue 15:4, C.I. Pigment Green 7 and C.I. Pigment Green 36.

Blue indanthrone pigments such as C.I. Pigment Blue 60.

The anionic dyes are typically, but not exclusively, commercially available dyes selected from acid dyes, direct dyes, reactive dyes and mordant dyes. As a rule, their chemical structure is different from that of the organic pigment.

Preferred are the following anionic dyes to be used inventively:

Acid dyes selected from C.I Acid Black 1, 24 and 48, C.I. Acid Blue 1, 7, 9, 25, 29, 40, 45, 74, 80, 83, 90, 92, 113, 120, 129 and 147, C.I. Acid Green 1, 3, 5, 25, 27, and 50, C.I. Acid Orange 6, 7, 8, 10, 12, 51, 52, 63 and 74, C.I. Acid Red 1, 4, 8, 14, 17, 18, 26, 27, 29, 37, 44, 50, 51, 52, 66, 73, 88, 97, 103, 114, 150, 151 and 183, C.I. Acid Violet 7 and 17, and C.I. Acid Yellow 1, 9, 11, 17, 23, 25, 29, 34, 36, 42, 54, 76, 99 and 169.

Direct dyes selected from C.I. Direct Blue 1, 14, 53 and 71, C.I. Direct Violet 51, C.I. Direct Red 2, 23, 28, 75, 80 and 81, and C.I. Direct Yellow 4, 8, 9, 12, 27, 50, 62 and 172.

Reactive dyes selected from C.I. Reactive Black 5, C.I. Reactive Blue 2, 4 and 15, C.I. Reactive Orange 16, C.I. Reactive Red 2 and 4, and C.I. Reactive Yellow 2.

Mordant dyes selected from C.I. Mordant Black 17 and C.I. Mordant Violet 5.

One or more anionic dyes can be used in the inventive pigment compositions.

The anionic dyes may also be pigment derivatives bearing one or more anionic, i.e. acidic groups which impart to them a (certain) water solubility. Examples of such groups are inorganic groups derived from mineral acids comprising sulfonic acid, sulfonate, sulfinic acid, sulfinate, phosphoric acid, phosphate groups, and organic groups derived from carboxylic acidslcarboxylates (carboxylic acid salts).

The anionic pigment derivative may be a derivative of organic pigment (1), on the one hand, but also need not to be of similar structure to organic pigment (1), on the other hand. As a rule, the anionic pigment derivatives give good results when associated with a non-derivative cationic dye.

Preferred anionic pigment derivatives are those derived from the preferred pigments mentioned hereinbefore.

The cationic dyes are typically, but not exclusively, also commercially available dyes which may be—according to their chemical characterization—azo, azomethin, methin, polymethin, azine, cyanine, oxazine, thiazine, thiazole, acridine, anthraquinone, triarylmethan, xanthene or ketone lmine dyes. Their chemical structure is generally different from that of pigment (1).

Preferred are the following cationic dyes to be used inventively:

Cationic black dyes selected from C.I. Basic Black 2 and C.I. Basic Black 7.

Cabonic blue dyes selected from C.I. Basic Blue 1, 3, 6, 7, 9, 11, 12, 16, 17, 24, 26, 40, 41, 57, 66, 80, 123 and 159.

Cationic green dyes selected from C.I. Basic Green 1, 4 and 5.

Cationic orange dyes selected from C.I. Basic Orange 2, 14, 21 and 54.

Cationic red dyes selected from C.I. Basic Red 1, 2, 5, 9, 10, 13, 22, 29, 46 and 54.

Cationic violet dyes selected from C.I. Basic Violet 1, 2, 3, 4, 10 and 35.

Cationic yellow dyes selected from C.I. Basic Yellow 1, 2, 11, 13, 17, 19, 21, 24, 28, 40, 45, 53, 61, 63 and 73.

One or more cationic dyes can be used in the inventive pigment compositions.

The cationic dye may also be a pigment derivative bearing one or more basic (basic means cationic) groups which impart to them a (certain) water solubility. Typical examples of cationic groups include ammonium groups ($-NH_4$) which may be primary, secondary, tertiary or quaternary substituted, further primary, secondary or tertiary amino groups, and also primary, secondary and tertiary carbon amido, sulfonamido, sulfinamido or phosphoramido.

The cationic pigment derivative may be a derivative of organic pigment (1), on the one hand, but also need not to be of similar structure to organic pigment (1), on the other hand. Preferred cationic pigment derivatives are those derived from the preferred pigments mentioned hereinbefore.

The cationic pigment derivatives can be combined with non-derivative anionic dyes to give good results, too.

When a combination of an anionic and a cationic pigment derivative is used in the inventive pigment compositions, one of said pigment derivatives is not derived from organic pigment (1), i.e. this derivative has to show a different chemical structure from the base structure of organic pigment (1).

When using alternative (2c)—covering mixtures of (2a) and (2b)—the general proviso that the compounds used must be anionic and cationic should be always observed.

Combination (2) of the inventive pigment compositions preferably comprises such pairs as:
  (anionic=negatively charged; cationic=positively charged)
  cationic dye+anionic dye (2a),
  cationic pigment derivative+anionic dye (2c),
  cationic dye+anionic pigment derivative (2c), or
  cationic pigment derivative+anionic pigment derivative (2b)
  (the two pigment derivatives must be structurally different)

Alternatively, it has been found that at least a partial replacement of the anionic/cationic coloured compound (anionic/cationic dye or anionic/cationic pigment derivative) with an anionic/cationic surfactant, respectively, can also lead to inventive pigment compositions with sufficient performance. As a rule, up to about ¾ (0 to 75 mol %) of the anionic/cationic dye (anionic/cationic pigment derivative) can be replaced by an anionic/cationic surfactant, respectively. As a preferred range for this replacement 0 to 50 mol % can be considered.

Suitable surfactants are known to those skilled in the art. Preferably they comprise e.g. long chain (fatty, containing e.g. 8 to 22, preferably 8 to 18 carbon atoms) alcohols, acids, esters, amides or amines and their derivatives, such as alkoxylates (ethoxylates), which contain positively/negatively charged groups.

In this context, reference is made to the relevant textbooks, scientific or technical publications.

Preferred combinations (2)—when anionic/cationic surfactants are used—comprise:
  cationic dye/cationic surfactant+anionic dye,
  cationic dye/cationic surfactant+anionic pigment derivative,
  cationic pigment derivative/cationic surfactant+anionic dye,
  cationic pigment derivative/cationic surfactant+anionic pigment derivative (the two pigment derivatives must be structurally different), or
  anionic pigment derivative/anionic surfactant+cationic pigment derivative (the two pigment derivatives must be structurally different), and also
  anionic dye/anionic surfactant+cationic dye, anionic dye/anionic surfactant+cationic pigment derivative ,or anionic pigment derivative/anionic surfactant+cationic dye The molar ratio of the components—assuming that both are mono-anionic and monocationic—of combination (mixture) (2a)(anionic and cationic dye), (2b) (anionic and cationic pigment derivative), or (2c) can vary within a broad range. Possible ratios of about (0.1–10):(10–0.1), or more preferred of (1–5):(5–1) can be used.

C.I. means Colour Index as compiled by the by The Society of Dyers and Colourists and The American Association of Textile Chemists and Colourists.

Details, such as descriptions and definitions, for the mentioned pigments, the anionic dyes as acid, direct, reactive and mordant dyes, and the cationic (basic) dyes can be found there.

The inventive compositions of organic pigments or organic pigment compositions (the latter may include typical additives such as abietyl res ins, other rheology modifiers and ink vehicle components) may contain usually from 50.1 to 99.8% by weight (b.w.), preferably from 80.0 to 99.0% (b.w.) of the pigment, usually from 0.1 to 49.8% (b.w.), preferably from 0.5 to 10.0% (b.w.) of at least one anionic coloured compound (dye), and usually from 0.1 to 49.8% (b.w.), preferably from 0.5 to 10% (b.w.) of at least one cationic coloured compound (dye). Preferably the combined amount of anionic/cationic coloured compounds in the pigment compositions is from 1 to 10% (b.w.).

Aqueous preparations of these compositions have a solids content usually from about 0.5% to 20%, preferably from 5 to 18%. Aqueous based organic pigment dispersions can be prepared from dry pigments, by use of additional surfactants, at a level of at least 50% pigment by conventional techniques.

In non-aqueous lithographic inks, pigment concentration normally is 8 to 20%. Ink concentrates, where rheology modifiers can be particularly useful, can contain up to 50% (0.5 to 50%) pigment. In certain circumstances, low pigment concentration below about 5% is also possible.

The (non-aqueous) pigment compositions may optionally contain further additives such as, but not exclusively, e.g. abietyl resins and abiety derivatives, surfactants, pigment derivatives, extenders, ink vehicle components, rheology modifiers, etc. Effective amounts should be used, e.g. from 0 to 50% (b.w.), based on the combined weight of the pigment and the dyes.

The dyes may be used as a solution or dispersion in water or other suitable solvent.

The dyes may also be used in press-cake, granule or dry powder form.

The dye mixture (complex of anionic and cabonic dye(s)) may also deliberatedly formed and isolated prior to use and utilised as a solution or dispersion in water or other suitable solvent. The dye mixture can be isolated as a filter (press) cake, redispersed into or for use in an aqueous pigment slurry, or mixed as filter cake with a filter cake of the pigment.

The dye (mixture) complex may also be used in granule or dry powder form.

The Isolated and dried material (dye mixture) can then be added to an aqueous or solvent based slurry of the pigment or blended with a dry pigment.

The anioniclcationic coloured compound (dye) may be incorporated independently or together into a preparation of pigment (1), preferably a water-based composition (dispersion), during or after its preparation by standard stirring/milling techniques (conditioning) or surface treating (coating)

Alternatively the dyes or dye complexes may be incorporated into the pigment during its synthesis, i.e. before or after coupling, but more preferably after completion of coupling, but before isolation, washing or drying.

When preparing inventive pigment compositions in solid form, such as pigment powders or pigment granules, the method comprises e.g. heating an aqueous pigment slurry (as obtained by normal synthesis steps) containing the necessary additives, to induce flocculation, followed by optional cooling and isolation which comprises such steps as filtering and washing until salt free, and then drying and/or granulating the composition. Alternatively, the method can be started by a dispersion step for the pigment in an aqueous solution of the dyestuffs (at least one anionic and at least one cationic dye).

Still another alternative comprises the co-flushing or co-drying of the pigment and the dye mixture. The preparation of flushed (pigment) compositions involves the addition of a flushing vehicle, such as an oil or a solution of resins and other additives, to the water-precipitated filter (press) cake or disperion (slurry) of the pigment/dye mixture composition. The direct transfer (flushing) of the pigment/dye mixture from the aqueous phase to the oil or non-polar phase is effected by kneading the filter cake and the vehicle together in a flusher or heavy-duty mixer under heat and vacuum.

The dye mixture (complex) can also be used in surface treated (coated) form, i.e treated e.g. with abietyl resins or fatty acids, in any one of the methods decribed before The inventive pigment compositions may be used in all customary industrial printing processes such as lithographic, flexographic, gravure, letterpress, screen, ink-jet, intaglio, aqueous or other printing inks, further in all customary industrial paint systems such as decorative, industrial, automotive or other paint systems, to provide improved rheology with no or at most minimalized reduction of colour strength.

The method of preparation of the ink system is by methods of shear to induce dispersion into a varnish system. Examples of the wide range of techniques are triple-roll-mill and bead mill. Varnish systems are also wide ranging and known by the artisan.

Examples of the final application are off-set lithography and sheet fed.

Alternatively, when preparing the printing inks or paint systems, the dyes may be incorporated independently or together (dye complexes) to a conventional ink or paint formulation before, during or after pigment addition.

For the preparation of the inks and paints corresponding high molecular weight organic substances, such as binders, synthetic resin dispersions etc. and the Inventive pigment compositions are usually dispersed or dissolved together, optionally together with customary additives,,such as dispersants, fillers, paint auxiliaries, siccatives, plasticizers and/or additional pigments or pigment precursors, in a common solvent or mixture of solvents. This can be achieved by dispersing or dissolving the individual components by themselves, or also several components together, and only then bringing all components together, or by adding everything together simultaneously.

It is the use of at least two dyes of opposing charge (dye complex) as part of a pigment composition which gives the inventive pigment compositions their particularly useful properties and advantageous effects, i.e. their improved rheological (flow) performance combined with no or at most a minimum loss in colour strength, over pigment compositions of the state of the art The desired effects and the other by-propertes can be moderated by the appropriate selection of the relative ratio and total amount of the two dyes. The dyes should also be selected that undesirable effects on product shade do not occur. As the pair of materials (dye complex) which are responsible for the improved rheological performance are both coloured, in general of the the same colour, almost no loss in colour strength is observed.

The present invention is further illustrated by, but not restricted to, the following examples in which all parts and percentages are by weight unless otherwise indicated. The temperatures are given in degrees centigrade.

EXAMPLES

Example 1

To a stirred C.I. Pigment Yellow 13 aqeous slurry containing 63 g of the pigment,an aqueous solution containing 2 g of 4,4'-bis[[1-[[(2,4-dimethylphenyl)amino]carbonyl]-2-oxypropyl]azo]-[1,1'-biphenyl]-2,2'disulphonic acid is added, followed by an aqueous solution containing 3.5 g of C.I. Basic Yellow 40. Following this an aqueous solution of Burez K50-505A potassium salt (potassium soap of disproportionated rosin, 50%, Eka-Nobel), containing the equivalent of 30 g resin acids, is added and the resulting slurry heated to roughly 95° C. by direct steam injection.

The slurry is acidified by dropwise addition of dilute hydrochloric acid, then cooled, filtered and washed until salt free. The product presscake is dried giving 94 g (=95% yield).

The resulting dye pair is thus formed in situ during pigment processing.

Example 2

The Example 1 procedure is repeated with 64 g of C.I. Pigment Yellow 13 plus 2.5 g of C.I. Basic Yellow 28 in place of C.I. Basic Yellow 40.

Example 3

The Example 1 procedure is repeated with 63.8 f o C.I. Pigment Yellow 13 plus 1.7 g of C.I. Basic Yellow 17 in place of C.I. Basic Yellow 40.

Example 4

The Example 1 procedure is repeated with 64.1 g of C.I. Pigment Yellow 13 plus 2.4 g of C.I. Basic Yellow 13 in place of C.I. Basic Yellow 40.

Example 5

The Example 1 procedure is repeated with 64 g of C.I. Pigment Yellow 13 plus 2.5 g of C.I. Basic Yellow 45 in place of C.I. Basic Yellow 40.

Comparative Examples A to D

Example A

The Example 1 procedure is repeated with 66.5 g of C.I. Pigment Yellow 13 and no added C.I. Basic Yellow 40.

Example B

The Example 1 procedure is repeated with 68.5 g of C.I. Pigment Yellow 13 and no additions of either C.I. Basic Yellow 40 or 4.4'-bis[[1-[[(2,4-dimethylphenyl)amino]carbonyl]-2-oxypropyl]azo]-[1,1'-biphenyl]-2,2'-disulphonic acid.

Example C

The Example 1 procedure is repeated with 65 g of C.I. Pigment 13 but in absence of 4.4'-bis[[1 -[[(2,4-dimethylphenyl)amino]carbonyl]-2-oxypropyl]azo]-[1,1 '-biphenyl]-2,2'-disulphonic acid.

Example D

The Example 1 procedure is repeated with 66 g of C.I. Pigment 13 but in absence of of 4.4'-bis[[1-[[(2,4-dimethylphenyl)amino]carbonyl]-2-oxypropyl]azo]-[1,1'-biphenyl]-2,2'-disulphonic acid. 2.5 g of C.I. Basic Yellow is also used in place of C.I. Basic Yellow 45.

Example 6

A stirred aqueous slurry containing C.I. Pigment Blue 15:3 (β-copper phthalocyanine) is heated to 90° C. A slurry containing 2.5 g of copper phthalocyanine monosulfonic acid is added and stirring continued for 30 minutes. An aqueous solution containing the equivalent of 4 g of C.I. Basic Blue 9 (Methylene Blue) is then added and stirring continued for 30 minutes more. The resulting slurry is cooled, filtered and washed until salt free, then dried giving 58 g of pigment composition.

Example 7

To a stirred aqueous slurry of 6.1 g of copper phthalocyanine monosulfonic acid at pH of 11 is added 3.49 g of C.I. Basic Blue 9. An aqueous solution containing 3.25 g of dodecylbenzene-p-sulfonic acid, sodium salt, is added and then the resulting sluryy is filtered and dried, giving a yield of 9.58 g (78%).

This dry complex is added at a 3% level to a stirred aqueous slurry of C.I. Pigment Blue 15:3 at 30° C. and pH 1. After stirring for 1 hour the slurry is filtered, washed until salt free and dried.

Instead of the sodium salt of dodecylbenzene-p-sulfonic acid an appropriate amount of a long chain alkyl ($C_{12}$–$C_{18}$) quaternary ammonium chloride can be used giving likewise good results.

Example 8

To a stirred aqueous slurry of 12.12 g of copper phthalocyanine monosulfonic acid at pH of 11 is added 3.74 g of C.I. Basic Blue 9 and the the resulting slurry is filtered and dried giving a yield of 11.84 g (74%).

This dry complex is added at a 3% level to a stirred aqueous slurry of C.I. Pigment Blue 15:3 at 30° C. and pH 1. After stirring for 1 hour the slurry is filtered, washed until salt free and dried.

Comparative Eamples E to G

Example E

The Example 6 procedure is repeated in the absence of C.I. Basic Blue 9.

Example F

The Example 6 procedure is repeated in the absence of both C.I. Basic Blue 9 and copper phthalocyanine monosulfonic acid.

Example G

The Example 8 procedure is repeated in the absence of both C.I. Basic Blue 9 and copper phthalocyanine monosulfonic acid.

Test Method:

The products of the foregoing examples were used to prepare aqueous dispersions containg 20% pigmentation which are tested into a commercial heatset varnish system on a Buhler SDY-200 three roll mill.

The inks are then reduced to between 12 to 16% pigmentation (depending on the pigment type) by the addition of further varnish.

Colouristic assessment is carried out on the prints produced from a Prufbau Printer and low shear flow assessed on a 45° angled plate after 2 or 24 hours, depending on the the pigment type (2 hours for yellow and red pigment commpositions, 24 hours for blue pigment compositions).

The figures in Table 1 are quoted in comparison to a commercial pigment standard (low shear flow and colour strength—100%, each).

TABLE 1

| Example No, | Low Shear Flow [%] | Colour Strength [%] |
|---|---|---|
| 1 | 195 | 100 |
| 2 | 150 | 110 |
| 3 | 140 | 100 |
| 4 | 130 | 100 |
| 5 | 140 | 100 |
| A (Comparison) | 95 | 105 |
| B (Comparison) | 90 | 110 |
| C (Comparison) | 90 | 110 |
| D (Comparison) | 110 | 95 |
| 6 | 290 | 100 |
| 7 | 220 | 100 |
| 8 | 160 | 100 |
| E (Comparison) | 170 | 100 |
| F (Comparison) | 100 | 100 |
| G (Comparison) | 100 | 100 |

Example 9

This example relates to an isolated complex of a dyestuff pair as an ink additive. An 80 ml aqueous solution containing 2.0 g 4,4'-bis[[1-[[(2,4-dimethylphenyl)amino]carbonyl]-2-oxypropyl]azo]-[1,1'-biphenyl]-2,2'-disulphonic acid is mixed thoroughly with an 80 ml aqueous solution containing the equivalent of 1.5 g cation weight of Basic Yellow 28. To this mixture a 45 ml aqueous solution of Burez K50-505A potassium salt, containing the equivalent of 1.6 g resin acids, is added resulting in increased alkalinity (pH 9.5). The mixture is heated to 60° C. and the pH reduced to 5.0 by the addition of dilute hydrochloric acid. The resulting material was filtered, washed and dried giving a 90% yield. The dry product is ground and blended with a standard diarylide yellow composition (Pigment Yellow 174) at a weight ratio of 1:19 respectively.

TABLE 2

| | Low shear flow | Strength |
|---|---|---|
| Example 9 | 240% | 102% |
| Comparative Example H (Pigment Yellow 174 alone) | 100% | 100% |

Example 10

To a stirred aqueous slurry containing 13.12 g of copper phthalocyanine monosulfonic acid at pH 11 is added 3.74 g of C.I. Basic Blue 9. The pH is returned to 11 and the resulting slurry filtered. The product is held as a press-cake.

The equivalent of 1.5 g dry weight is re-dispersed into a stirred aqueous based slurry containing 50 g pigmentary C.I. Pigment Blue 60 and the resulting mixture heated to 70° C. After stirring for 50 minutes the slurry is filtered, washed until salt free and dried.

Example 11

To a stirred aqueous slurry containing 13.12 g of copper phthalocyanine monosulfonic acid at pH 11 is added 3.74 g of C.I. Basic Blue 9. The pH is adjusted to 2 and the resulting slurry filtered. The product is held as a filter cake.

The equivalent of 1.5 g dry weight of the filter cake is re-dispersed into a stirred aqueous based slurry containing 50 g pigmentary C.I. Pigment Blue 60 and the resulting mixture heated to 70° C. After stirring for 50 minutes the slurry Is filtered, washed until salt free and dried.

Example J

A stirred aqueous based slurry containing 50 g pigmentary C.I. Pigment Blue 60 is heated to 70° C. After stirring for 50 minutes the slurry is filtered, washed until salt free and dried. This material is used as a standard for comparison with examples 10 and 11.

TABLE 3

| Example No. | Low Shear Flow [%] | Colour Strength [%] |
|---|---|---|
| 10 | >140% | 100% |
| 11 | >140% | 100% |
| J (Comparison) | 100% | 100% |

Example 12

To a stirred aqueous based slurry containing 7.84 g quinacridone monosulfonic acid at pH 11 is added 3.56 g Basic Red 46. The pH is returned to 11 and the slurry filtered. The product is held as a filter cake.

The equivalent of 1.2 g dry weight of the filter cake is. re-dispersed into a stirred aqueous based slurry containing 40 g of crystalline pigmentary Pigment Red 202. The slurry is then heated to 70° C. and held for 30 minutes then filtered, washed salt free and dried.

Example 13

To a stirred aqueous based slurry containing 3.5 g quinacridone monosulphonic acid at pH 3 is added 3.67 g Basic Red 46. The pH is then taken to 11 and an aqueous solution of Burez K50-505A containing the equivalent of 1.5 g resin acids is added. The pH is then slowly reduced to 5.0 by dilute hydrochloric acid addition and the product filtered, washed salt free and dried.

1 g of this dry material is blended with 30 g dry crystalline pigmentary Pigment Red 202.

Example 14

To a stirred aqueous based slurry containing 3.5 g quinacridone monosulphonic acid at pH 7 is added an aqueous solution containing 3.67 g Basic Red 46 at pH7. The mixture is stirred for 50 minutes then filtered, given a mild wash and dried.

1.2 g of the dry material is combined with 40 g size-reduced crude Pigment Red 202 in a traditional solvent conditioning treatment. The slurry is then allowed to cool, filtered, washed thoroughly and dried.

Example K 120 g crystalline pigmentary Pigment Red 202 is prepared from size-reduced crude Pigment Red 202 in a traditional solvent conditioning treatment. The slurry is then isolated as a filter cake and washed thoroughly. This material is used as crystalline pigmentary Pigment Red 202 in examples 12 and 13. A portion is also dried and used as a comparative standard for examples 12, 13 and 14.

TABLE 4

| Example No. | Low Shear Flow [%] | Colour Strength [%] |
|---|---|---|
| 12 | 320 | 100 |
| 13 | 145 | 100 |
| 14 | 340 | 105 |
| K (Comparison) | 100 | 100 |

The invention claimed is:

1. A pigment composition comprising (1) an organic pigment selected from the group consisting of monoazo, disazo, naphthol, dioxazone, azomethin, azocondensation, metal complex, nitro, perinone, quinoline, anthraquinone, benzimidozolone, isoindoline, isoindolinone, quinacridone, hydroxyanthraquinone, aminoanthraquinone, anthrapyrimidine, indanthrone, flavanthrone, pyranthrone, anthantrone, isoviolanthrone, diketopyrrolopyrrole, carbazole, indigo and thioindigo pigments; and
   (2) a combination of at least one anionic and at least one cationic coloured compound wherein the combination (2) comprises
   (a) at least one anionic and at least one cationic dye, each of a chemical structure differing from that of the organic pigment (1),
   (b) at least one anionic and at least one cationic pigment derivative, the chemical structure of at least one of which is not derived from said organic pigment (1), or
   (c) mixtures of (a) and (b).

2. The pigment composition according to claim 1 wherein the organic pigment is a mono- or disazo pigment, a metal complex, an indanthrone or a quinacridone.

3. The pigment composition according to claim 2 wherein the organic pigment is a mono- or disazo pigment, or a metal complex.

4. A pigment composition according to claim 1 wherein the organic pigment is a naphthol pigment.

5. The pigment composition according to claim 3 wherein the organic pigment is a mono- or disazo pigment which is a mono- or diarylide yellow pigment selected from the group consisting of C.I. Pigment Yellow 1, 2, 10, 12, 13, 14, 17, 61, 62, 63, 64, 65, 73, 74, 75, 83, 127, 168, 174, 176, 188 and 191.

6. The pigment composition according to claim 3 wherein the organic pigment is a disazo orange pigment selected from the group consisting of C.I. Pigment Orange 16 and C.I. Pigment Orange 34.

7. The pigment composition according to claim 2 wherein the organic pigment is a naphthol red pigment selected from the group consisting of C.I. Pigment Red 48:1, C.I. Pigment Red 48:2, C.I. Pigment Red 48:3, C.I. Pigment Red 48:4, C.I. Pigment Red 48:5, C.I. Pigment Red 49:1, C.I. Pigment Red 52:1, C.I. Pigment Red 52:2, C.I. Pigment Red 52:3, C.I Pigment Red 53:1, C.I. Pigment Red 53:2, C.I. Pigment Red 53:3, C.I. Pigment Red 57:1, C.I. Pigment Red 57:2, C.I. Pigment Red 58:2, C.I. Pigment Red 58:4, C.I. Pigment Red 63:1 and C.I. Pigment Red 64:1, or a quinacridone red pigment being C.I. Pigment Red 202.

8. The pigment composition according to claim 4 wherein the organic pigment is a naphthol red pigment selected from the group consisting of C.I. Pigment Red 48:1, C.I. Pigment Red 48:2, C.I. Pigment Red 48:3, C.I. Pigment Red 48:4, C.I. Pigment Red 48:5, C.I. Pigment Red 49:1, C.I. Pigment Red 52:1, C.I. Pigment Red 52:2, C.I. Pigment Red 52:3, C.I Pigment Red 53:1, C.I. Pigment Red 53:2, C.I. Pigment Red 53:3, C.I. Pigment Red 57:1, C.I. Pigment Red 57:2, C.I. Pigment Red 58:2, C.I. Pigment Red 58:4, C.I. Pigment Red 63:1 and C.I. Pigment Red 64:1.

9. The pigment composition according to claim 2 wherein the organic pigment is a blue or green copper phthalocyanine pigment selected from the group consisting of C.I. Pigment Blue 15:1, C.I. Pigment Blue 15:2, C.I. Pigment Blue 15:3, C.I. Pigment Blue 15:4, C.I. Pigment Green 7 and C.I. Pigment Green 36, or an indanthrone blue pigment being C.I. Pigment Blue 60.

10. The pigment composition according to claim 3 wherein the organic pigment is a blue or green copper phthalocyanine pigment selected from the group consisting of C.I. Pigment Blue 15:3, C.I. Pigment Blue 15:4, C.I. Pigment Green 7 and C.I. Pigment Green 36.

11. The pigment composition according to claim 1 wherein the anionic dye is selected from the group consisting of acid dyes, direct dyes, reactive dyes and mordant dyes.

12. The pigment composition according to claim 1 wherein the anionic dye is an organic pigment derivative containing one or more acidic groups.

13. The pigment composition according to claim 11 wherein the anionic dye is an acid dye selected from the group consisting of C.I Acid Black 1, 24 and 48, C.I. Acid Blue 1, 7, 9, 25, 29, 40, 45, 74, 80, 83, 90, 92, 113, 120, 129 and 147, C.I. Acid Green 1, 3, 5, 25, 27, and 50, C.I. Acid Orange 6, 7, 8, 10, 12, 51, 52, 63 and 74, C.I. Acid Red 1, 4, 8, 14, 17, 18, 26, 27, 29, 37, 44, 50, 51, 52, 66, 73, 88, 97, 103, 114, 150, 151 and 183, C.I. Acid Violet 7 and 17, and C.I. Acid Yellow 1, 9, 11, 17, 23, 25, 29, 34, 36, 42, 54, 76, 99 and 169.

14. The pigment composition according to claim 11 wherein the anionic dye is a direct dye selected from the group consisting of C.I. Direct Blue 1, 14, 53 and 71, C.I. Direct Violet 51, C.I. Direct Red 2, 23, 28, 75, 80 and 81, and C.I. Direct Yellow 4, 8, 9, 12, 27, 50, 62 and 172.

15. The pigment composition according to claim 11 wherein the anionic dye is a reactive dye selected from the group consisting of C.I. Reactive Black 5, C.I. Reactive Blue 2, 4 and 15, C.I. Reactive Orange 16, C.I. Reactive Red 2 and 4, and C.I. Reactive Yellow 2.

16. The pigment composition according to claim 11 wherein the anionic dye is a mordant dye selected from the group consisting of C.I. Mordant Black 17 and C.I. Mordant Violet 5.

17. The pigment composition according to claim 1 wherein the cationic dye is an azo, azomethin, methin, polymethin, azine, cyanine, oxazine, thiazine, thiazole, acridine, anthraquinone, triarylmethan, xanthene or ketone imine dye.

18. The pigment composition according to claim 1 wherein the cationic dye is an organic pigment derivative containing one or more basic groups.

19. The pigment composition according to claim 17 wherein the cationic dye is
   a black dye selected from the group consisting of C.I. Basic Black 2 and C.I. Basic Black 7,
   a blue dye selected from the group consisting of C.I. Basic Blue 1, 3, 6, 7, 9, 11, 12, 16, 17, 24, 26, 40, 41, 57, 66, 80, 123 and 159,
   a green dye selected from the group consisting of C.I. Basic Green 1, 4 and 5,
   an orange dye selected from the group consisting of C.I. Basic Orange 2, 14, 21 and 54,
   a red dye selected from the group consisting of C.I. Basic Red 1, 2, 5, 9, 10, 13, 22, 29, 46 and 54,
   a violet dye selected from the group consisting of C.I. Basic Violet 1, 2, 3, 4, 10 and 35, or
   a yellow dye selected from the group consisting of C.I. Basic Yellow 1, 2, 11, 13, 17, 19, 21, 24, 28, 40, 45, 53, 61, 63 and 73.

20. The pigment composition according to claim 1 wherein combination (2b) comprises an anionic pigment derivative and a cationic pigment derivative, one of said derivatives being not derived from organic pigment (1).

21. The pigment composition according to claim 1 wherein combination (2) comprises the pairs of
   cationic dye+anionic dye (2a),
   cationic pigment derivative+anionic dye (2c),
   cationic dye+anionic pigment derivative (2c), or
   cationic pigment derivative+anionic pigment derivative (2b) wherein the pigment derivatives are structurally different.

22. The pigment composition according to claim 1 comprising a partial replacement of the anionic and cationic coloured compounds with anionic and cationic surfactants, respectively.

23. The pigment composition according to claim 1 comprising from 50.1 to 99.8% by weight of the organic pigment (1), from 0.1 to 49.8% by weight of at least one anionic coloured compound, and from 0.1 to 49.8% by weight of at least one cationic coloured compound.

24. The pigment composition according to claim 1 wherein the organic pigment is a mono- or disazo pigment which is a mono- or diarylide, or a metal complex which is a copper phthalocyanine pigment, an indanthrone or a quinacridone.

25. The pigment composition according to claim 24 wherein the organic pigment is a mono- or disazo pigment which is a mono- or diarylide, or a metal complex which is a copper phthalocyanine pigment.

26. The pigment composition according to claim 2 wherein the organic pigment is a β-naphthol or a β-oxynaphthoic acid (BONA) pigment.

27. The pigment composition according to claim 1 comprising from 80.0 to 99.0% by weight of the organic pigment (1), from 0.5 to 10.0% by weight of at least one anionic coloured compound, and from 0.5 to 10% by weight of at least one cationic coloured compound.

28. The pigment composition according to claim 23 wherein combination (2) comprises the components of
   cationic dye/cationic surfactant+anionic dye,
   anionic dye/anionic surfactant+cationic dye,
   cationic dye/cationic surfactant+anionic pigment derivative,
   anionic dye/anionic surfactant+cationic pigment derivative,
   cationic pigment derivative/cationic surfactant+anionic dye,
   anionic pigment derivative/anionic surfactant+cationic dye, cationic pigment derivative/cationic surfactant+anionic pigment derivative wherein the pigment derivatives are structurally different, or
   anionic pigment derivative/anionic surfactant+cationic pigment derivative wherein the pigment derivatives are structurally different.

29. An aqueous preparation or non-aqueous dispersion comprising a pigment composition according to claim 1.

30. Method for preparing an aqueous preparation according to claim 29 comprising
   adding said anionic and cationic coloured compounds to the organic pigment (1) during its synthesis, conditioning or surface treatment, or
   adding said anionic and cationic coloured compounds separately, as aqueous composition or in dry form, to the organic pigment (1) which is in form of a slurry, or
   adding a separately prepared and isolated complex of said anionic and cationic coloured compounds to the organic pigment (1) which is in form of an aqueous slurry or organic solvent preparation.

31. Method according to claim 30 wherein the separately prepared and isolated complex of said anionic and cationic coloured compounds is in the form of a presscake which is redispersed and added to the organic pigment (1) which is in the form of a slurry.

32. Method of preparing an aqueous preparation according to claim 30 wherein the said anionic and cationic coloured compounds and their complexes are surface treated.

33. A non-aqueous dispersion according to claim 29 further comprising additives selected from the group consisting of abietyl resins and abiety derivatives, surfactants, pigment derivatives, extenders, ink vehicle components, rheology modifiers, dispersants, fillers, paint auxiliaries, siccatives and plasticizers.

34. The pigment composition according to claim 1 which is a solid composition.

35. Method for preparing the solid pigment composition according to claim 34 comprising dispersing either the organic pigment (1) in aqueous solutions of said anionic and cationic coloured compounds, or dispersing said anionic and cationic coloured compounds in dispersions of organic pigment (1), optionally cooling the dispersions, filtering and washing them until salt free, and then drying and/or granulating the obtained presscakes.

36. Method for preparing the solid pigment composition according to claim 34 comprising co-flushing or co-drying a filter cake or dispersion of organic pigment (1) and a filter cake or dispersion of a separately prepared and isolated complex of said anionic and cationic coloured compounds.

37. Method of preparing the solid pigment composition according to claim 34 comprising mixing a dry organic pigment (1) with a dry complex of said anionic and cationic coloured compounds.

38. Method of preparing the solid pigment compositions according to claim 36 wherein the separately prepared and isolated complex of anionic and cationic coloured compounds is surface treated.

39. A non-aqueous printing ink composition or paint system comprising the pigment composition according to claim 1.

40. A method for preparing a non-aqueous printing ink composition or paint system according to claim 39 comprising adding said pigment composition to a conventional printing ink formulation or paint system.

41. A method of preparing printed or painted articles which method comprises the step of utilizing the non-aqueous printing ink composition or paint system according to claim 39 in printing or painting procedures.

* * * * *